Figure 1:
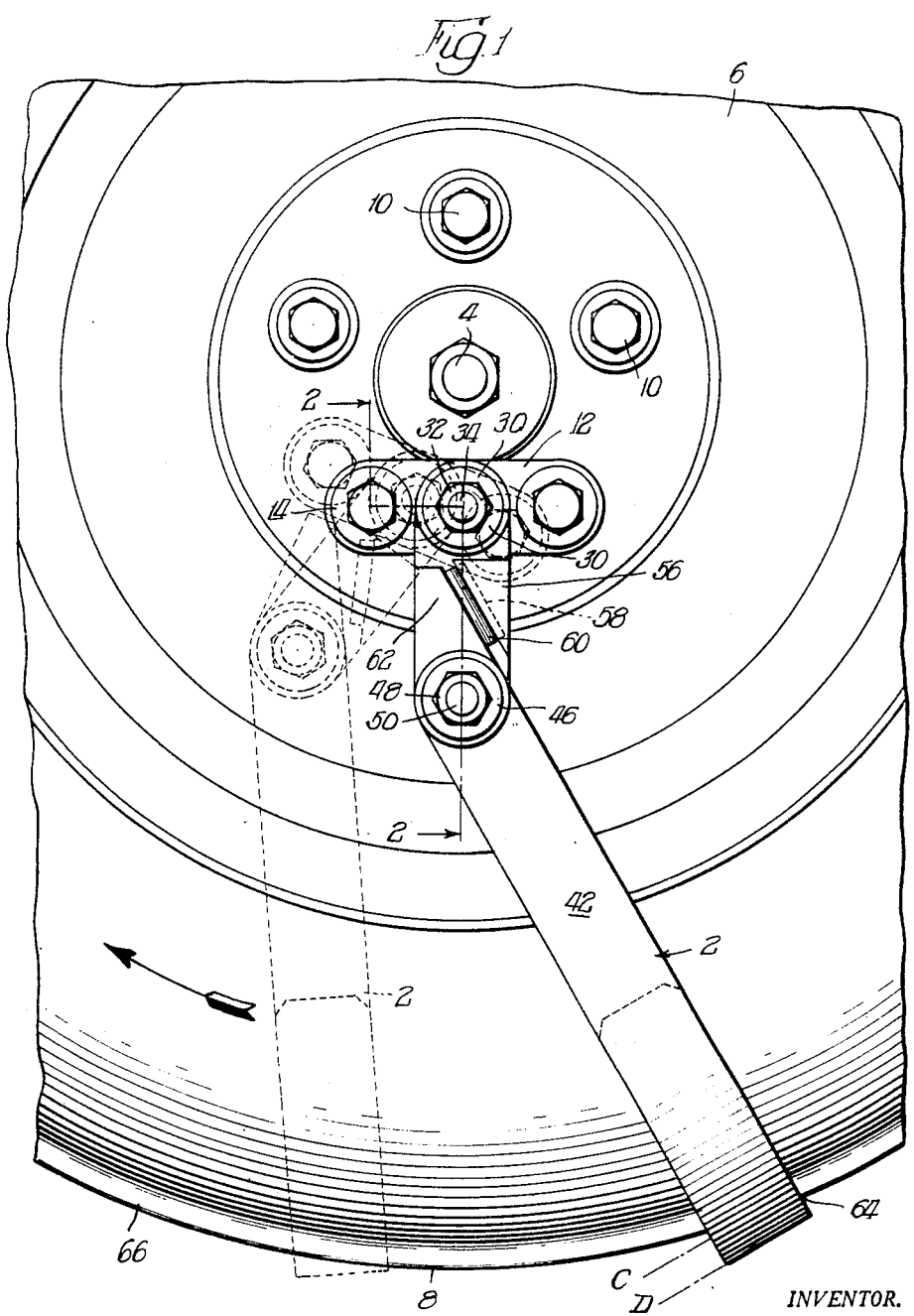

June 15, 1948.  C. R. THOMPSON  2,443,406
TRACTION DEVICE

Filed Oct. 20, 1944  2 Sheets-Sheet 1

INVENTOR.
Clyde R. Thompson,
BY
Wilkinson Huxley Byron & Knight
ATTYS.

June 15, 1948.  C. R. THOMPSON  2,443,406
TRACTION DEVICE

Filed Oct. 20, 1944  2 Sheets-Sheet 2

INVENTOR.
Clyde R. Thompson,
BY
Wilkinson Huxley Byron & Knight
ATTYS

Patented June 15, 1948

2,443,406

UNITED STATES PATENT OFFICE 2,443,406

TRACTION DEVICE

Clyde R. Thompson, Salt Lake City, Utah

Application October 20, 1944, Serial No. 559,499

4 Claims. (Cl. 152—225)

The present invention relates to traction devices and more particularly to such devices which may be readily attached to an automobile wheel or the like for securing additional traction for moving the vehicle.

Among the objects of the present invention is to provide a novel traction device of relatively simple construction which may be readily attached to and detached from the wheel of a vehicle, such as an automobile or the like, for securing additional traction for extricating said vehicle from mud or snow and to prevent skidding of the vehicle.

Another object of the present invention is to provide a novel traction device comprising a plurality of articulated members, one of which is secured to the wheel center of the wheel for the vehicle or the like in spaced relation to the axle therefor, and which further includes another element having a tire embracing portion and abutment means between the said members for angularly positioning the same with respect to one another so as to dispose said tire embracing portion in a position to secure the additional traction desired and to further provide for ease of disassembling said device from the wheel.

More particularly, a device made in accordance with the present invention involves the provision of a supporting member pivoted to the articulatedly connected members for readily connecting the device to and detaching the same from a wheel center and wherein the device may further be provided with a resilient abutment means defining the angular disposition of the said articulated members.

Other objects, features, capabilities and advantages are comprehended by the invention, as will later appear and as are inherently possessed thereby.

Referring to the drawings—

Figure 2:
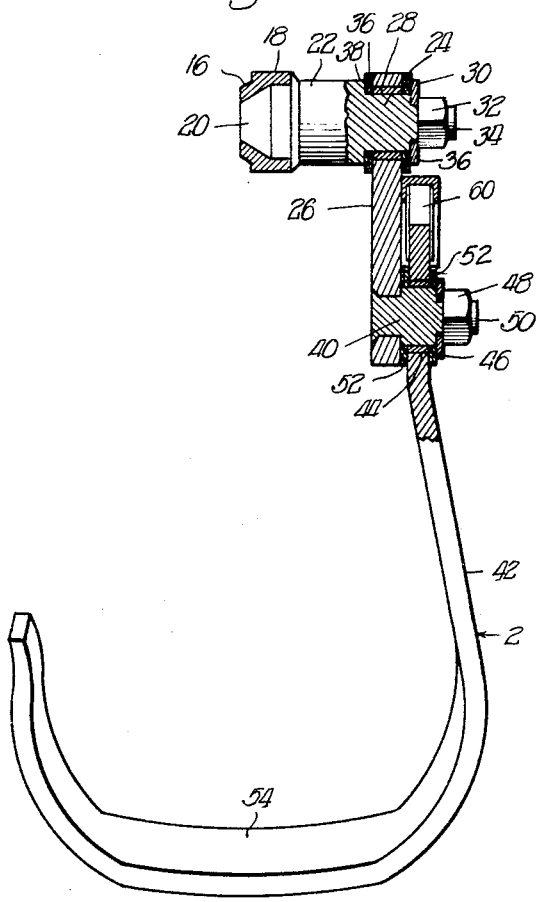

Figure 1 is a fragmentary view in side elevation of a wheel showing a traction device made in accordance with the present invention attached thereto; and Figure 2 is a view partly in section and partly in elevation of the traction device shown in Figure 1 of the drawings and taken in the plane represented by the lines 2—2 of that figure.

Referring now more in detail to the drawings, an embodiment selected to illustrate the present invention is represented generally by the reference numeral 2 and is disclosed as being attached to the wheel of an automobile mounted upon the axle 4 and comprising a wheel center 6 upon which is mounted a tire 8.

In order to attach the device 2 to the wheel, the hub cap is removed to expose the plurality of lug bolts such as 10, two of which must be removed to secure the device 2 in operative position with respect to the wheel.

The traction device according to the present invention comprises a supporting member 12 provided adjacent each end with apertured hubs 14 of similar construction formed exteriorly with annular beveled surfaces 16 adapted to be received in the adjacent lug bolt recesses provided in the wheel center 6. These apertured hubs more particularly are constituted as including the bosses 18 terminating inwardly in the beveled recesses 20 to receive the lug bolts 10 which have been removed to admit the supporting member and which are again turned into locking engagement with the wheel center to secure the supporting member in operative position with respect thereto. Intermediate the hubs 14 is provided an outwardly and laterally extending supporting element 22 terminating in the end journal 24 adapted to receive one end of a link member 26 formed with an opening provided with the bushing 28 fitting over the journal 24. The link 26 is secured in operative relation to the supporting element 22 by a lock washer 30 and a nut 32 threaded on the threaded end 34 of the supporting element 22. In providing the mounting relation between the link 26 and the supporting element 22, friction washers 36 are provided on both sides of the link member, one of which is in abutting relation to the shoulder 38 defining the journal 24 and the other of which is in abutting relation to the lock washer 30.

Provided adjacent the other end of the link member 26 is a journal member 40 extending laterally from the outer face of the said member 26 and which is adapted to receive the apertured end of a tire embracing member 42. The opening through said member is provided with a bushing 44 fitting over the journal 40 and the said member is held in pivotal association with the link member 26 by means of the washer 46 and the nut 48 threadedly engaging the threaded end 50 of the journal element 40. The connection between members 26 and 42 is completed by means of the friction washers 52, one of which is interposed between the member 42 and the face of the member 26 and the other of which is interposed between member 42 and the washer 46. The member 42 extends downwardly from its pivotal connection with the link 26 and is formed with a laterally extending portion 54 conforming substantially to the general contour of the tire which it embraces when in normal operative position.

Because of the disposition of the link member 26 and the member 42, described above, the latter is adapted to pivot with respect to the link member 26 in substantially the same plane as that in which said link member pivots with respect to the wheel.

The link member 26 is further provided with a housing or projection 56 disposed on the front face thereof and which is formed with a recess 58 adapted to provide a housing for receiving a resilient insert 60 serving as an abutment adapted to engage with the portion 62 of the member 42 which extends beyond the pivot point 40. Such abutment means provides an assembly for angularly positioning members 26 and 42 with respect to one another when in their normal operative position with respect to the tire 8. This angular disposition of these members constitutes one of the novel aspects of the invention having certain desirable characteristics in the particular assembly.

In that connection, it is to be observed that by virtue of the pivotal connection of the device 2 to the wheel center in spaced relation to the axle 4 and also the angular disposition of the members 26 and 42 the tire embracing portion 54 is disposed in a plane generally represented as D which is offset angularly with respect to a plane represented at C drawn tangent to the line of contact between the portion 54 and the tire, as at 64. Such disposition of the tire embracing portion 54 with respect to the tire 8 is accounted for by the fact that the distance from the axle 4 to the line of contact 64 through the pivot point 24 is somewhat greater than the radial distance between the axle 4 and the line of contact represented by the reference numeral 64.

The angular disposition of the portion 54 with respect to the tangent plane C through the point of contact 64 increases the effective gripping relation of the portion 54 with respect to the surface over which the vehicle is travelling and likewise makes possible easy application or removal of the device inasmuch as member 42 can be rotated through an arc whose radius is defined by the distance between pivot point 12 and the line of engagement 64, thus releasing the device from contact with the tire and permitting the operator to manipulate lug bolts 10.

In the operation of the device with the wheel turning in a clock-wise direction as represented by the arrow in Figure 1 of the drawings, it normally assumes a position with respect to the wheel as shown in full lines in Figure 1 until such time as the portion 54 engages the ground surface over which the vehicle is travelling. As the wheel continues to rotate, the articulate connection 46 between the elements 26 and 42 permits angular displacement of the members with respect to one another, as shown in dotted lines in Figure 1 of the drawings. During angular displacement of members 26 and 42, tire embracing portion 54 is maintained in suitable tractive relation with the ground to assure continued forward movement of the vehicle. Such articulate connection between the two elements 26 and 42 accommodates the flexing of the tire upon its contact with the ground surface and in effect accomplishes the desired results without the use of springs or other complicated mechanism.

It is, of course, clearly appreciated that in the event the wheel is rotated in the opposite direction from that disclosed in the drawings the device will assume a position in opposed relation to that actually disclosed and will engage the tire substantially at the location indicated as 66 on the drawings.

While I have herein described and upon the drawings shown an illustrative embodiment of the invention, it is to be understood that the invention is not limited thereto but may comprehend other constructions, arrangements of parts, details and features without departing from the spirit of the invention.

What is claimed is:

1. In a vehicle, the combination of a wheel axle, a wheel having a wheel center mounted on said axle and being provided with a tire, a traction device comprising pivotally connected members, one of said members being constituted as a link pivotally mounted adjacent one end thereof on said wheel center in spaced relation to said axle, and the other of said members extending outwardly from said link member and having a part embracing said tire, and being adapted to pivot with respect to said link in substantially the same plane as that in which said link pivots with respect to said wheel, said last-named member extending beyond its pivotal connection with said link member, and an abutment on said link member engageable with said extension for normally positioning said members in angular relation to one another.

2. In a vehicle, the combination of a wheel axle, a wheel having a wheel center mounted on said axle and being provided with a tire, a traction device comprising pivotally connected members, one of said members being constituted as a link pivotally mounted adjacent one end thereof on said wheel center in spaced relation to said axle, and the other of said members extending outwardly from said link member and having a part embracing said tire, said last-named member extending beyond its pivotal connection with said link member, and a cushioning abutment carried by link member engageable with said extension for normally positioning said members in angular relation to one another.

3. In a vehicle, the combination of a wheel axle, a wheel having a wheel center mounted on said axle and being provided with a tire, a traction device comprising pivotally connected members, one of said members being constituted as a link pivotally mounted adjacent one end thereof on said wheel center in spaced relation to said axle, and the other of said members extending outwardly from said link member and having a part embracing said tire, said last-named member extending beyond its pivotal connection with said link member, an housing carried by said link member, and a resilient member mounted in said housing and engageable with said extension for normally positioning said members in angular relation to one another.

4. A traction device comprising a supporting member having means for attachment to a wheel center, articulatedly connected members one of which is pivotally connected to said supporting member and the other of which is provided with a laterally disposed tire embracing portion, one of said members extending beyond the pivot connecting the same together and providing an abutment shoulder, an housing carried by the other of said members, and a resilient abutment member mounted in said housing and engageable with said shoulder for angularly positioning said members with respect to one another.

CLYDE R. THOMPSON.

REFERENCES CITED

The following references are of record in the file of this patent:

UNITED STATES PATENTS

| Number | Name | Date |
|---|---|---|
| 1,049,751 | Maurer | Jan. 7, 1913 |
| 1,540,470 | Hayden | June 2, 1925 |
| 2,212,076 | Rollings | Aug. 10, 1940 |

FOREIGN PATENTS

| Number | Country | Date |
|---|---|---|
| 153,032 | Australia | 1938 |